United States Patent Office 3,435,329
Patented Mar. 25, 1969

3,435,329
SCR TYPE ALTERNATING CURRENT ELECTRIC POWER CONTROL
Colin Edward Hunter, Luton, England, assignor to National Research Development Corporation, London, England
Filed Mar. 15, 1966, Ser. No. 534,445
Claims priority, application Great Britain, Mar. 16, 1965, 11,061/65
Int. Cl. G05f 1/40, 1/52, 1/60
U.S. Cl. 323—22       3 Claims

ABSTRACT OF THE DISCLOSURE

An A.C. controlled rectifier system to control the application of power to light dimmers or plural loads or to control the speed of a motor. The outputs of a square wave generator and a function generator are added and the resultant compared with a reference to control the firing of the controlled rectifiers.

---

Figure 1:
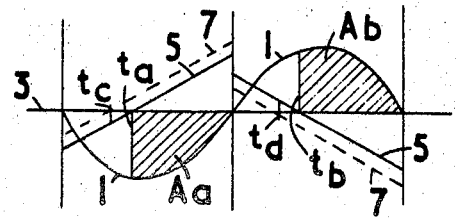

The present invention relates to alternating current electric power control.

Of the various systems at present in use for the control of electric power, for example in theatre lighting or in the speed control of electric motors, none is entirely satisfactory. Systems of resistor banks, or "dimmers," are unnecessarily clumsy and apart from absorbing electrical energy and dissipating large amounts of heat when set for small currents are inconvenient for the simultaneous control of more than one circuit. Thyratron and saturable reactor systems, although more convenient from the user point of view, impose such a voltage drop on the power controlled that their characteristics change with changing load, so that, for example, for theatre lighting a set of saturable reactors has to be kept for each circuit and the correct reactor for the circuit load inserted in the control circuit. If the load in a circuit has to be changed by a significant amount, the reactor has to be changed too. Thyratron control has the further disadvantage that thyratrons are notoriously unreliable.

The invention makes use of solid state semiconductor controlled rectifiers, sometimes called thyristors. In this present specification such devices will be referred to as SCR's. Such devices present a high impedance to a power circuit until a triggering pulse is applied to them. This application of a triggering pulse is usually known as "firing" by analogy with thyratrons. When SCR's are fired they will pass a fairly heavy current with a low voltage drop. When the heavy current is turned off (for example, at the end of a half cycle of alternating current) the devices will again present a high impedance until fired once more. Any device having such properties will be referred to in the present specification as "a device of the SCR type."

According to the present invention there is provided an alternating current electric power control system including a device of the SCR type connected in an alternating current circuit, a first alternating voltage square waveform generator synchronously connected to said alternating current supply, a transfer function generator synchronously connected to said alternating current supply, a first intermediate waveform generator connected to said first square waveform generator and said transfer function generator, means for generating a further waveform, a comparing device connected to said first intermediate waveform generator and said means for generating a further waveform and a firing unit responsive to the outputs of said first intermediate waveform generator and said means for generating a further waveform and connected to said comparing device and said device of the SCR type.

The given waveform may be a waveform generated by the addition of a transfer function synchronized with the alternating voltage supply to a further alternating voltage square waveform in antiphase to the original alternating voltage square waveform. The two transfer functions may be the same or different. In this case the comparing means may be a variable proportion device (such as a potentiometer) connected between conductors carrying the intermediate waveform and the given waveform. The firing unit may detect when the output of the variable proportion device reaches the given direct voltage level (which may be earth potential).

Alternatively the given waveform may be an error waveform. For example it may be necessary to control the current fed to a load in the alternating current circuit and the load may have an output from which an error waveform may be derived (as an error waveform may be derived from a tachometer connected to an electric motor driven by an alternating current circuit).

Figure 2:
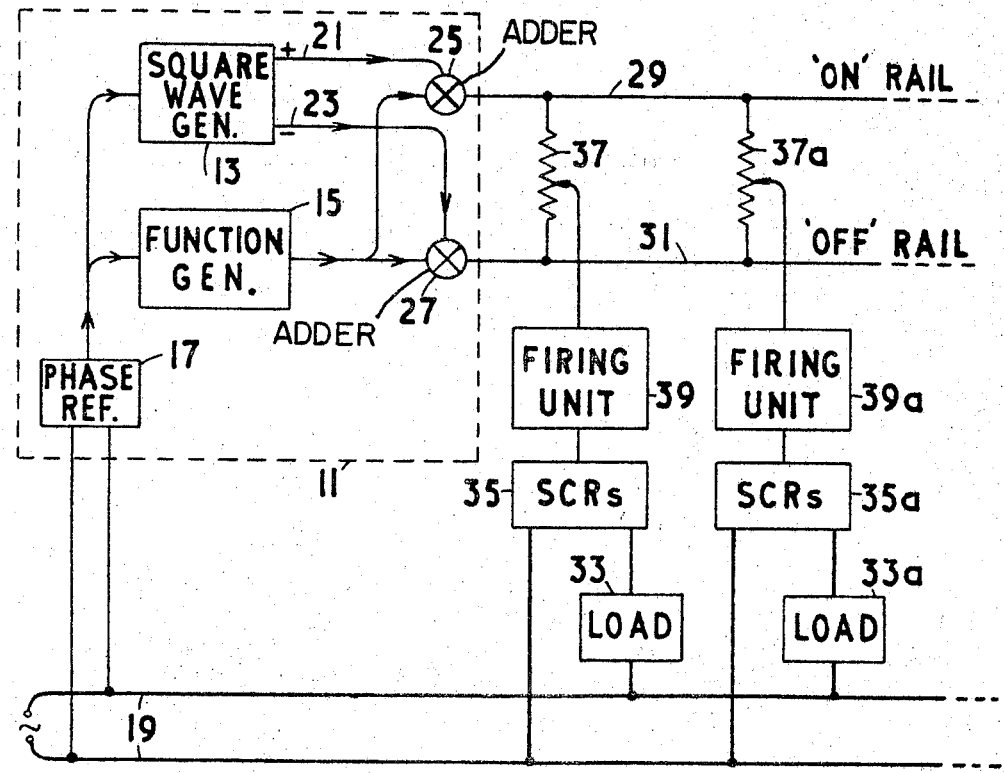
Figure 3:
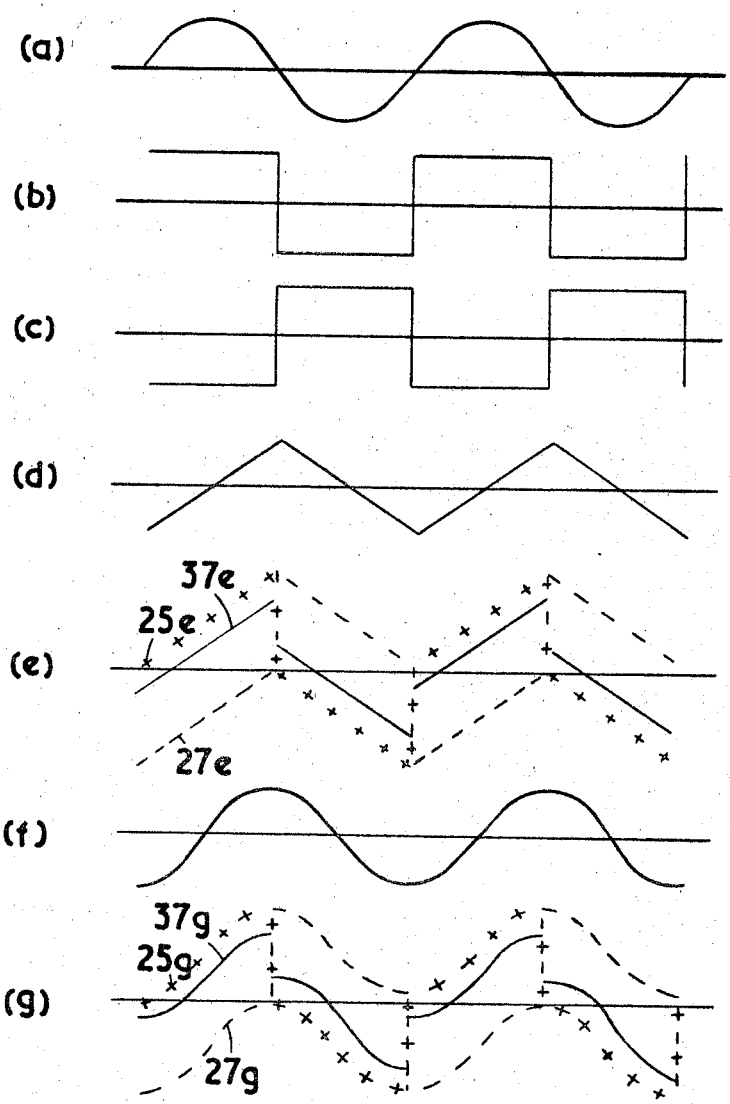
Figure 4:
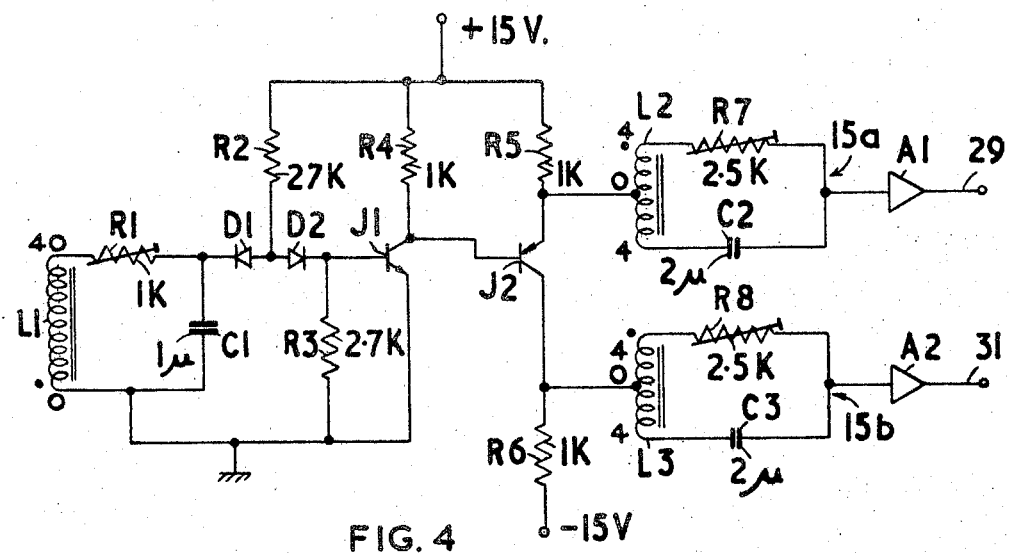
Figure 5:
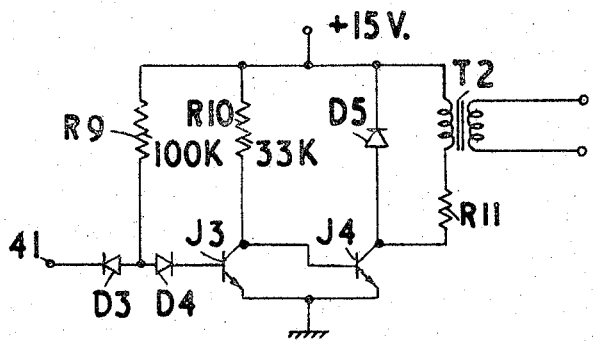
Figure 6:
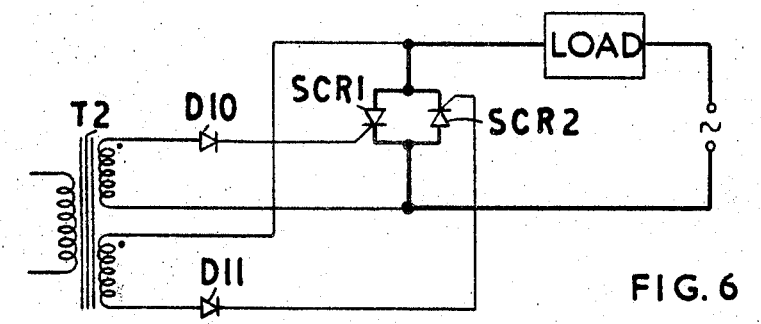
Figure 7:
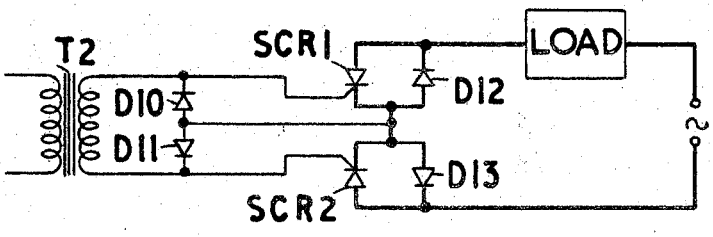
Figure 8:
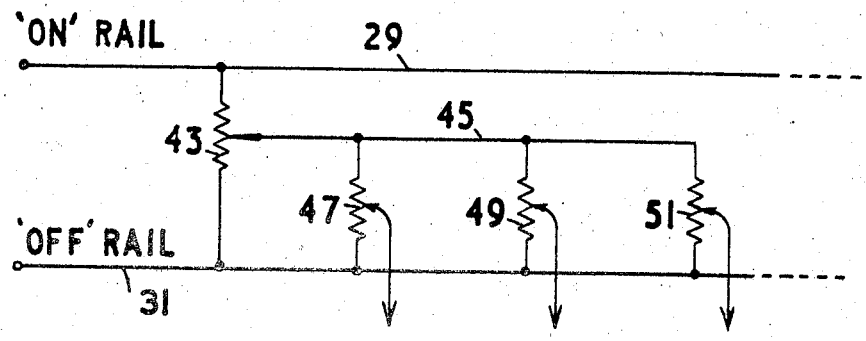
Figure 9:
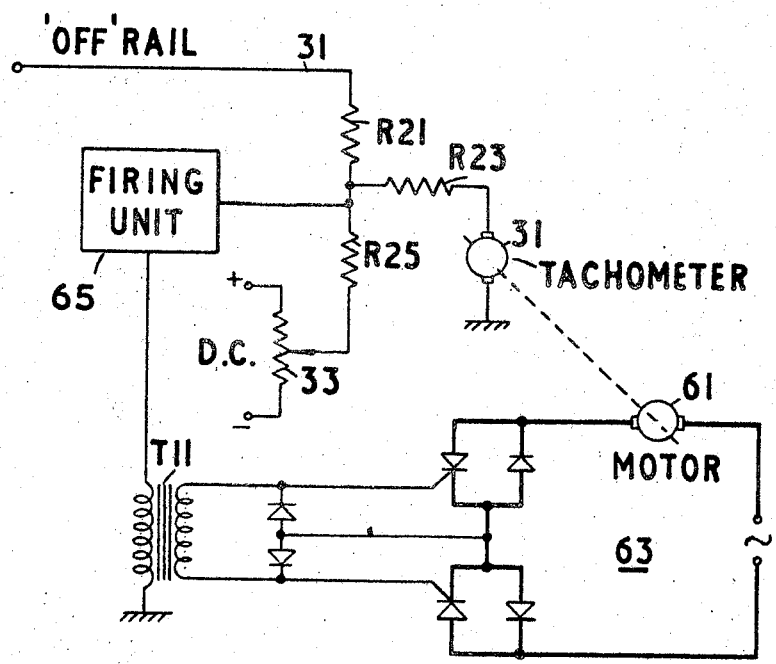

Embodiments of the invention will be described by way of example with reference to the accompanying drawings, in which:

FIGURE 1 is a drawing of a waveform used to illustrate the operation of an SCR circuit;
FIGURE 2 is a schematic diagram of a circuit for controlling the mean voltage applied to a load;
FIGURE 3 is a drawing of various waveforms which may occur in the embodiment illustrated in FIGURE 2;
FIGURE 4 is a detailed circuit diagram of the waveform generator 11 of FIGURE 2;
FIGURE 5 is a detailed circuit diagram of the firing unit 39 of FIGURE 2;
FIGURE 6 and FIGURE 7 are alternative detailed circuit diagrams of the SCR circuits 35 of FIGURE 2;
FIGURE 8 is a detailed circuit diagram of a master and slave control circuit; and
FIGURE 9 is a circuit diagram of a circuit for controlling a Velodyne.

FIGURE 1 is a drawing of a waveform used to illustrate the operation of an SCR circuit. A sinusoidal wave 1 represents the alternating voltage available to the load. The area between each half-cycle of the wave 1 and the axis 3 determines the total power available. The method of controlling the power in the circuit is to allow current to flow during a portion only of each half cycle of the wave. This portion starts with the firing of the SCR and ends at the end of the half cycle.

For example a waveform 5 may be generated and used to generate a firing pulse each time $t_a$ it passes through zero. The SCR is fired at the time $t_a$ and power is delivered to the load for the remainder of the half-cycle. In the second half-cycle illustrated a further SCR is fired at a time $t_b$ and power is delivered to the load for the remainder of the half-cycle. The shaded areas $Aa$, $Ab$ are proportional to the main volts per half-cycle applied to the load.

In order to adjust the power delivered, the waveform 5 may be D.C. shifted to a position such as 7, alternate half cycles being D.C. shifted in opposite directions. In FIGURE 1 the result will be that the SCR's are fired earlier in each half cycle, at times $t_c$ and $t_d$ respectively.

FIGURE 2 is a schematic diagram of a circuit for controlling the mean voltage applied to a load. A waveform generator 11 includes a square wave generator 13 and a function generator 15. Both the square wave generator 13 and the function generator 15 are controlled in phase by a phase reference unit 17 fed from A.C. mains 19. The square wave generator 13 produces a square wave output 21 in phase with the A.C. mains 19 and a square wave output 23 in antiphase therewith. The outputs 21 and 23 are fed to two adder units 25 and 27 respectively. The output of the function generator 15 is also fed to the adder units 25 and 27. The output of the adder unit 25 is designated the ON rail 29 and the output of the adder unit 27 is designated the OFF rail 31.

The power fed to a load 33 from the A.C. mains 19 is controlled by an SCR circuit 35. The SCR 35 is controlled by a potentiometer 37 connected across the ON and OFF rails 29 and 31 respectively, via a firing unit 39.

A large number of power circuits may be fed from a single waveform generator: this is illustrated in FIGURE 2 by the provision of a further circuit including a load 33a, an SCR circuit 35a, a potentiometer 37a and a firing unit 39a.

The action of the circuit will be more fully explained with reference to FIGURE 3, which is a drawing of various waveforms which may occur in the embodiment illustrated in FIGURE 2.

In FIGURE 3 a waveform (a) is a phase reference waveform to illustrate the phase of the A.C. mains 19. The outputs 21 and 23 of the square wave generator 13 are illustrated by two waveforms (b) and (c) in phase and antiphase respectively with the reference waveform (a).

The function generator 15 may generate a triangular waveform such as that illustrated by a waveform (d) in FIGURE 3. This triangular waveform is phase retarded by 90° compared with the reference waveform (a). A waveform (e) illustrates the outputs of the adding units 25 and 27 and the potentiometer 37 when the waveform (d) is used. The output of the adding unit 25 is indicated by a line of crosses 25e and the output of the adding unit 27 is indicated by a line of dashes 27e in the waveform diagram (e). The crosses and dashes are used to suggest the positive and negative (i.e. inphase and antiphase) outputs of the square wave generator 13. The output of the potentiometer 37 will in general be a waveform intermediate between the waveforms 25e and 27e. The waveform 37e is a possible example. Such a waveform will have the property that, as the potentiometer 37 is adjusted, alternate half cycles will be D.C. shifted in opposite directions. This is the requirement mentioned above with reference to FIGURE 1 and fulfilled by the waveform 5 of that figure.

Alternatively the function generator 15 may be arranged to generate a waveform such as is illustrated by a waveform (f) of FIGURE 3. This is a sinusoidal waveform phase retarded by 90° compared with the reference waveform (a). A waveform diagram (g) is analogous to the waveform diagram (e), i.e. the outputs (consequent upon the generation of the waveform (f) by the function generator 15) of the adding units 25 and 27 and the potentiometer 37 are illustrated respectively by a line of crosses 25g, a line of dashes 27g and a continuous line 37g (this last being a possible example of the output of the potentiometer 37; the actual output will depend on the actual setting of the slider of the potentiometer).

The actual waveform (such as (d) or (f)) to be generated by the function generator 15 depends on what relationship between the position of the slider of each potentiometer such as 37 and the power to be applied to each load such as 33 is required. For example, the waveform (d) will give a different relationship between potentiometer setting and power applied to the load from the waveform (f). Any convenient waveform to meet a particular requirement may be generated. For a normal waveform such as the waveform (d) or (f) the peak-to-peak amplitude should be slightly less than that of the square waveforms generated by the square wave generator 13. This ensures that the two extremes of total and zero power applied to the load such as 33 are reached.

If the square waves generated by the square wave generator 13 are accurately phased to the A.C. supply then the firing point for each half cycle will necessarily remain within that half cycle. This is important, as if a firing pulse occurs after the end of the half cycle during which it should have occurred then it will have no effect. Worse still, if a firing pulse occurs before the beginning of the half cycle during which it should occur then it will not fire the SCR at all and instead of a high power being delivered to the load no power will be delivered at all during the half cycle.

FIGURE 4 is a circuit diagram of the waveform generator 11 of FIGURE 2.

The phase reference is taken from low current secondary windings on a mains transformer. There are three secondary windings: a 40 volt R.M.S. winding L1 and two centre-tap 4–0–4 volt R.M.S. windings L2 and L3.

One end of the winding L1 feeds the base of an N-P-N transistor J1, arranged in the common emitter configuration, via phase retard network R1, C1 and two diodes D1 and D2, connected in series anode to anode. The common anodes of the two diodes D1 and D2 are connected to a +15 volt supply via a 27 kilohm resistor R2 and the base of the transistor J1 is connected to chassis via a 2.7 kilohm resistor R3. The transistor J1 has as its collector load a 1 kilohm resistor R4 and feeds a P-N-P transistor J2, which, with a 1 kilohm emitter load resistor R5 and a 1 kilohm collector load resistor R6 acts as a concertina type phase splitter. The transistors J1 and J2 may be of the types 2N1308 and ACY 20 respectively and the diodes D1 and D2 may both be of the type OA91.

The first stage of the circuit, i.e. the transistor J1 stage, is basically an overdriven amplifier used to provide a square wave output. The phase retard network R1C1 is used to correct for the phase advance produced by the mains transformer. The diodes D1 and D2 and the resistors R2 and R3 are necessary to avoid exceeding the base rating of the transistor J1. The square wave output from the collector of the transistor J1 is phase split in the transistor J2 stage to give the required antiphase square wave outputs. If the mains waveform is in the phase illustrated in FIGURE 3(a) then the outputs of the emitter and collector respectively of the transistor J2 are illustrated by FIGURE 3(b) and (c).

The emitter output of the transistor J2 feeds an amplifier A1 via a function generator circuit 15a and the collector output of the transistor J2 feeds an amplifier A2 via a function generator circuit 15b. The circuits 15a and 15b together constitute the function generator 15 of FIGURE 1. The amplifiers A1 and A2 feed the "ON" rail 29 and the "OFF" rail 31 respectively.

In more detail, the emitter output of the transistor J2 is applied to the centre tap of the winding L2. One end of the winding L2 is connected to the output of the circuit 15a via a 2.5 kilohm semi-variable resistor R7 and the other end of the winding L2 is connected to the output of the circuit 15a via a 2 μf. capacitor C2.

Similarly the collector output of the transistor J2 is applied to the centre tap of the winding L3, one end of the winding L3 is connected to the output of the circuit 15b via a 2.5 kilohm semi-variable resistor R8 and the other end of the winding L3 is connected to the output of the circuit 15b via a 2 μf. capacitor C3.

The action of the transformer secondary windings is to superimpose sinusoidal waveforms on the square wave outputs of the transistor J2. The resistance-capacitance circuits R7C2 and R8C3 are adjusted (by adjustment of the respective resistors R7 and R8) to obtain at the outputs of the circuits 15a and 15b respectively a waveform that is 90° phase displaced with respect to the supply waveform. That is to say, if the supply waveform is as illustrated in FIGURE 3(a) then the voltage between input and output of the circuit 15a is as illustrated in FIGURE 3(f), and the same is true for the circuit 15b. These voltages are, of course, superimposed on the square waves illustrated in FIGURE 3(b) and (c) respectively, and so the outputs of the circuits 15a and 15b with respect to earth are as illustrated by the waveforms 25g and 27g respectively of FIGURE 3(g).

The outputs of the circuits 15a and 15b are applied to the amplifiers A1 and A2 respectively in order to supply the control potentiometers such as 37 and 37a, FIGURE 2. Approximately unity gain is required, and A.C. coupling must be used at some point in order to eliminate the ±7.5 volt mean level present on the input. It is necessary that a moderately low D.C. output impedance is obtained in this embodiment as each firing circuit such as 39 and 39a, FIGURE 2, feeds about 100 micro-amps mean current back to the waveform generator. The input impedance of the amplifiers A1 and A2 should be greater than about 25 kilohms to avoid loading the timing circuits. The required output voltage swing is ±15 volts peak to peak.

FIGURE 5 is a circuit diagram of the firing unit 39 of FIGURE 2. An input terminal 41 is connected to the slider of the potentiometer 37 of FIGURE 2 and feeds the base of a transistor J3 via two diodes D3 and D4 in series, connected anode-to-anode. The base of a further transistor J4 is fed from the collector of the transistor J3. The emitters of both transistors J3 and J4 are earthed. A 100 kilohm resistor R9 is connected between the common anodes of the diodes D3 and D4 and the +15 volt line. The collector load of the transistor J3 is a 33 kilohm resistor R10 and the collector load of the transistor J4 consists of the primary winding of a transformer T2 in parallel with a diode D5, connected with its anode adjacent to the collector of the transistor J4. The self inductance of the primary winding of the transformer T2 should be between 0.1 and 0.5 henry and its resistance 150 ohms. If the resistance is smaller it should be made up with a series resistor, such as a resistor R11 as shown.

The function of the circuit is to detect when the input waveform (such as the waveform 37g, FIGURE 3(g)) crosses the zero line. At this time the transistor J4 will be turned on or off depending on the direction of change of input voltage. There will therefore be a step in the collector current waveform of the transistor J4. This step will be effectively differentiated by the action of the transformer T2 to produce a pulse output. If the input waveform crosses zero very slowly the action of the circuit may be helped by the application of some positive feedback. This feedback may be provided either by means of a small capacitor connected from the collector of the transistor J4 to the common anodes of the diodes D3 and D4 or, if the resistance of the primary winding of the transformer T2 is not too great, by returning the resistor R9 to the junction of the primary winding of the transformer T2 and the resistor R11.

It should be noted that this circuit does not cause the SCR's to be fired as the input crosses zero exactly, but, rather a voltage a few hundred millivolts from zero. If it is important that the SCR's are fixed exactly at the zero crossing point a suitable small direct voltage should be applied either to the input or to the emitters of the transistors J3 and J4.

The diodes D3, D4 and D5 may be type OA91, the transistor J3 2N1308 and the transistor J4 OC139.

FIGURE 6 and FIGURE 7 show alternative arrangements of the SCR's. In FIGURE 6 the transformer T2 has two secondary windings, wound 2:1+1. These fire two SCR's, SCR1 and SCR2, via steering diodes (OA10) D10 and D11 respectively.

In FIGURE 7 the transformer has a single secondary winding, wound 2:1. The two SCR's are SCR1 and SCR2, connected in series and by-passed in the reverse direction by power diodes D12 and D13 respectively. Again the SCR's SCR1 and SCR2 are fired via OA10 steering diodes D10 and D11 respectively.

Care must be taken with the phasing of the gate signals. The firing circuit (FIGURE 5) gives a positive signal at the collector of the transistor J4 for a positive going input at the terminal 41 as the input passes through zero. The transformer T2 and the A.C. supply must be so connected that the SCR whose anode is positive (for the time being) receives a positive gate signal.

Variation in output from the complete system is obtained by varying the potentiometer such as 37, FIGURE 2. A master control to various slave circuits each having further individual controls may be arranged by the circuit shown in FIGURE 8, where a master control potentiometer 43 connected between the "ON" rail 29 and the "OFF" rail 31 defines a control rail 45. Further potentiometers 47, 49, 51 controlling the slave circuits are connected between the rails 45 and 31.

The resistance value of the master control potentiometer depends on the number of individual controls it feeds, and emitter followers can be added if necessary.

The circuit of FIGURE 5 has been described relative to the crossing of a zero line by an input waveform but there is no reason why the line crossed by the input waveform should not be at any other voltage, fixed or variable. For example, it may be an error voltage in an electric motor speed control system; the circuit described will allow the speed to be controlled in magnitude by the rotation of the potentiometer such as 37 in FIGURE 1 while still being kept constant (for a given setting of the potentiometer such as 37) by its own error voltage.

FIGURE 9 is a circuit diagram of a circuit for controlling a Velodyne motor 61. The motor 61 constitutes the load in a circuit 63 similar to that described above with reference to FIGURE 7 and controlled by a firing unit 65 via a transformer T11. The firing unit 65 is controlled from the "OFF" rail 31 via a resistor R21, from a tachometer 31 on the Velodyne shaft via a resistor R23 and from a potentiometer 33 (connected as a variable direct voltage source) via a resistor R25.

The action of the circuit, whereby the motor follows the setting of the potentiometer 33, is as follows. If the potentiometer 33 is set at zero, an output such as 27g in FIGURE 3(g) is applied to the firing unit 65 via the resistor R21. If the SCRs are fired at all it will only be at the extreme end of each half cycle, and the Velodyne 61 will be driven alternately forwards and backwards in alternate half cycles, the net result being that the Velodyne 61 will remain stationary.

If a non-zero direct voltage from the potentiometer 33 is applied to the firing unit 65 via the resistor R25, however, the input waveform to the firing unit 65 will cross the zero line at some time different from zero and power will be applied to the circuit 63 during alternate half cycles. The result will be that the Velodyne will be driven in one direction. The tachometer 31 will give a voltage output sufficient to maintain the Velodyne speed constant. If the setting of the potentiometer 33 is varied or reversed the Velodyne speed will be similarly varied or reversed.

I claim:
1. An alternating current electric power control system comprising:
   an SCR type device connected in an alternating current circuit,
   an alternating voltage square waveform generator synchronously connected to said alternating current supply and having two outputs mutually in antiphase,
   means for generating a voltage waveform monotonic in each half cycle and increasing and decreasing in alternate half cycles of said alternating current supply,
   a first adding means responsive to an output of said alternating voltage square waveform and said means for generating a monotonic voltage waveform,
   a second adding means responsive to the antiphase output of said alternating voltage waveform generator and said means for generating a monotonic voltage waveform,
   a comparing device connected to said first adding means and said second adding means, and a firing unit responsive to the outputs of said first adding means and said second adding means and connected to said comparing device and said SCR type device.

2. A power control system as in claim 1 and in which said comparing device is a voltage divider device responsive to the voltage outputs of said first adding means and said second adding means in variable proportions.

3. A power control system as in claim 2 and in which said voltage divider device is a variable potentiometer.

References Cited

UNITED STATES PATENTS

| | | | |
|---|---|---|---|
| 2,748,317 | 5/1956 | Van De Wiel | 315—166 X |
| 2,921,247 | 1/1960 | Morrison | 318—28 |
| 3,181,046 | 4/1965 | Sutton | 318—28 |
| 3,241,023 | 3/1966 | Eby | 318—341 X |
| 3,310,758 | 3/1967 | Cottrell | 318—341 X |
| 3,346,794 | 10/1967 | Stemmler | 318—341 X |

LEE T. HIX, *Primary Examiner.*

A. D. PELLINEN, *Assistant Examiner.*

U.S. Cl. X.R.

315—166; 318—341, 345; 323—24